Sept. 20, 1966   J. P. SLATTERY   3,274,472
TWO SPEED INDUCTION MOTOR
Filed Oct. 3, 1963
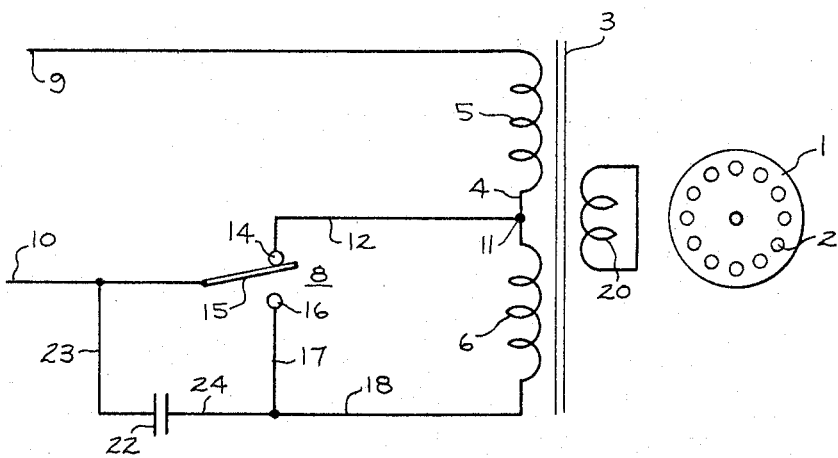
*INVENTOR.*
JOHN P. SLATTERY
BY *Walter E. Kule*
HIS ATTORNEY 3,274,472
TWO SPEED INDUCTION MOTOR
John P. Slattery, Louisville, Ky., assignor to General Electric Company, a corporation of New York
Filed Oct. 3, 1963, Ser. No. 313,652
2 Claims. (Cl. 318—200)

The present invention relates to a two speed motor and is more particularly concerned with a two speed shaded pole induction motor including power factor correction means.

Single phase two-speed alternating current induction motors of the shaded pole type conventionally comprise a squirrel cage rotor, a stator concentrically arranged around the rotor and provided with a single phase winding consisting of first and second series-connected coil sections which are mutually coupled together and a shading coil angularly displaced from the winding. For high speed operation only one of the coils is connected to a source of alternating current power and for low speed operation the two coil sections are connected in series to the source of power. Because the shaded pole single phase induction motors are normally of somewhat lower cost than other two speed motors, they are frequently considered for use for driving two speed fans and the like. For power factor correction and in order to decrease the operating costs, it has been common practice to employ a capacity for power factor correction. However, in prior two speed induction motors, a special or additional coil or coil section has been provided in the motor in autotransformer relation with one or both of the coils employed for the high and low speed operation of the motor and this additional coil has been connected to the capacitor to provide the desired power factor correction.

It is a primary object of the present invention to provide a new and improved two speed induction motor which does not require a separate or special coil or coil section for power factor correction.

It is another object of the invention to provide a two speed induction motor including means for obtaining power factor correction only during high speed operation of the motor when the motor draws a high current.

Further objects and advantages of this invention will become apparent from the following description and the features of novelty which characterize the invention will be pointed out with particularity in the claims annexed to and forming part of this specification.

In accordance with a preferred embodiment of the present invention there is provided a two speed induction motor comprising a stator having a single phase winding consisting of first and second series-connected coil sections which are mutually coupled to each other and a capacitor for correcting the power factor during high speed operation of the motor. Switch means are provided for connecting the first coil section to a source of alternating current power for operation of the motor on high speed and the circuitry is so arranged that when the switch means is in its first position a capacitor is connected across the second coil section for power factor correction. When the switch is moved to its second or low speed position, the two coil sections are series-connected to the source of alternating current power and the capacitor is shorted out of the circuit. Thus, there is provided a motor including means for correcting the power factor when the current drawn by the motor is high and means for eliminating the usual capacitor energizing coil when the motor is operating on low speed when the current consumption is low and power factor correction is not important.

For a better understanding of the invention reference may be had to the accompanying drawing in which the single figure is a schematic illustration of an improved two speed induction motor including the advantageous features of the present invention.

Referring now to the drawing, there is shown a preferred embodiment of the present invention comprising a conventional squirrel cage rotor 1 including a plurality of conductive members 2 extending the length of the rotor, the conductive members being short circuited or connected together at each end of the rotor. The rotor is eccentrically and rotatably mounted within a stator which is indicated schematically by the reference numeral 3. The stator includes a plurality of poles and a single phase winding generally indicated by the numeral 4 is wound on the poles. The winding 4 consists of two coil sections 5 and 6 providing high and low speed operation of the motor. It will be understood that these two coil sections 5 and 6 are arranged on the stator in coaxial relation so as to be strongly mutually coupled.

A two position switch means 8 is provided for connecting one or both of the coil sections 5 and 6 to a pair of supply lines 9 and 10 which are adapted to be connected to a source of alternating current power. More specifically, the coil section 5 which is connected to the coil section 6 at point 11 has its opposite end connected directly to the line 9. The coil section 5 is adapted to be connected across the lines 9 and 10 by means of a conductor 12 connecting the point 11 with the high speed contact 14 of the switch 8 so that when the switch arm 15 of the switch 8 engages the high speed contact 14, only the coil section 5 is connected across the lines 9 and 10. The low speed contact 16 of switch 8 is connected to coil 6 by lines 17 and 18 in such a manner that when the switch arm 15 engages the contact 16 the two coil sections are connected in series to lines 9 and 10.

A short circuit or shading coil 20 is also provided in connection with the stator 3 and is so arranged with respect to the coil section 5 as to be coupled thereto relatively weakly. The arrangement of the coil 20 is well known in the art, the purpose of this coil being to cause the motor to start when the coil section 5 is energized.

In accordance with the present invention, the motor circuit also includes a capacitor 22 so connected into the motor circuit as to have a voltage developed across the capacitor by the low speed coil section 6 during high speed operation of the motor to provide for the power factor correction during high speed operations.

More specifically the capacitor 22 is connected in parallel with the switch 8 or more specifically the contact 16 of this switch by lines 23 and 24 respectively connecting the capacitor to the supply line 10 and to the conductor 18 connecting the coil 6 to the contact 16. Thus, when the switch 8 is in its high speed position with the switch arm 15 engaging the high speed contact 14, a closed circuit is completed connecting the coil 6 with the capacitor 22. Since the coil section 5 and 6 are connected in autotransformer relation, the coil 6 then performs the function of a secondary and develops a voltage across a capacitor 22 to provide the desired high power factor during high speed operation of the motor. When on the other hand the switch 8 is in its low speed position with the switch arm 15 engaging the contact 16, the capacitor 22 is in effect short circuited or in other words the autotransformer circuit for developing a voltage on the capacitor 22 is broken and the coil 6 instead performs its function of providing low speed operation of the motor.

From the above description it will be seen that the coil section 6 thus provides low speed operation when connected across lines 9 and 10 and power factor correction at high motor speed. Thus, it performs a dual function eliminating the usual separate coil previously employed for power factor correction purposes. Under high speed operation when the current is high the coil section 6 and the capacitor 22 provide the desired power factor correction while at low speed operation when the current drawn by the motor is low and the power output of the motor is low so that the power factor correction is not as important, the coil section 6 provides the second coil required for low speed operation of the motor.

While the invention has been described with reference to a particular embodiment thereof, it will be apparent that various changes may be made therein without departing from the spirit and scope of the invention and it is intended by the appended claims to cover all such modifications as fall within the true spirit and scope of the invention.

What I claim as new and desire to secure by Letters Patent of the United States is:

1. In an induction motor, a stator comprising a single phase winding consisting of first and second series-connected coil sections mutually coupled to each other, a capacitor, switch means movable to either of two operative positions for connecting said first section to a source alternating current power and for connecting said capacitor across said second section in one position and to series connect both of said sections to said source of power and short said capacitor in said second position whereby said motor starts and runs at a high speed with power factor correction when said switch is in its first position and at a low speed when said switch is in its second position.

2. In an induction motor, a stator comprising a single phase winding consisting of first and second series-connected coil sectiones mutually coupled to each other, a capacitor, switch means movable to either of two operative positions for connecting said first section to a source of alternating current power and for connecting said capacitor across said second section in one position and to series connect both of said sections to said source of power and short said capacitor in said second position whereby when said switch is in its first position said motor runs at a high speed with power factor correction and when said switch is in its second position said coil sections are series-connected for low speed operation.

References Cited by the Examiner

UNITED STATES PATENTS

| | | | |
|---|---|---|---|
| 1,858,255 | 5/1932 | Weichsel | 318—220 |
| 2,539,144 | 1/1951 | Kuhlmann | 318—220 X |

FOREIGN PATENTS 362,509  12/1931  Great Britain.

ORIS L. RADER, *Primary Examiner.*

G. FRIEDBERG, *Assistant Examiner.*